Patented Jan. 13, 1953

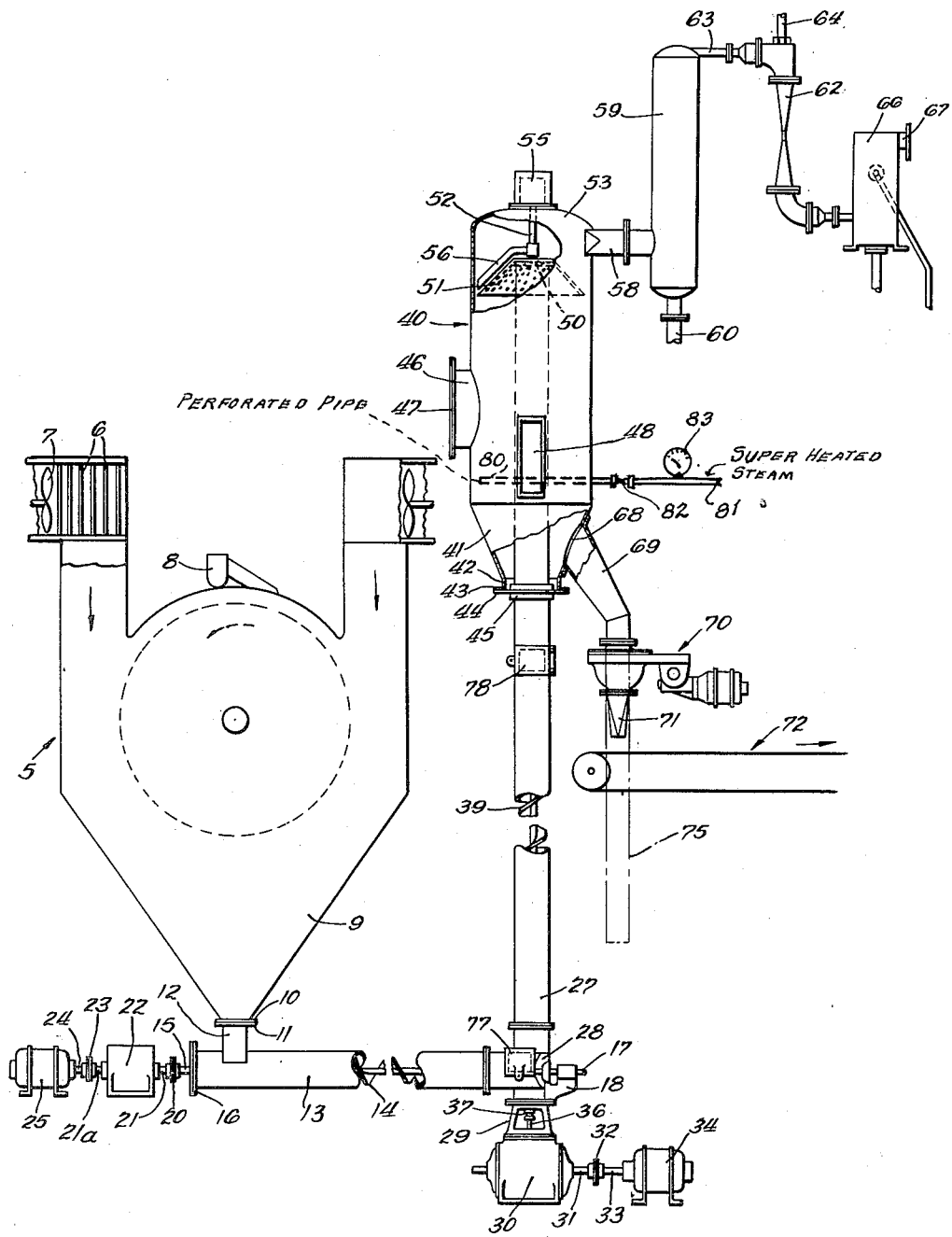

2,624,955

UNITED STATES PATENT OFFICE 2,624,955

SALT DRYING AND COOLING APPARATUS

Clinton S. Robison, Chicago, Ill.

Application February 21, 1949, Serial No. 77,468

3 Claims. (Cl. 34—92)

This invention relates to the treatment of crystalloid materials, and has to do with an apparatus for drying and cooling such materials.

The apparatus of my invention is, in certain aspects, particularly suitable for treatment of salt and will be described, by way of example, as used for that purpose, it being understood that it may be used for treatment of various crystalloid materials. In the commercial production of salt it is a common practice to deliver a salt slurry to a rotary suction filter in which the salt is separated from the water content of the slurry and is heated, the salt cake is scraped from the filter drum, and the salt is delivered from the filter to cooling means in which the salt is cooled by atmospheric air. The salt is delivered from the filter to the cooling means at a temperature of about 150° F. to 250° F. and at that time has a moisture content of from about 2% to 0.10%. Air cooling of the hot salt is objectionable in that it requires considerable time for cooling of the salt to proper temperature for delivery to the storage bins, to which the salt should be delivered at a temperature not substantially above 160° F. and with a moisture content less than 0.10%. Air cooling of the salt tends to slow down the rate of production, unless rather extensive and costly cooling equipment is provided, both of which are objectionable as contributing to increased cost of production. Also, in air cooling, the salt in cooling is apt to absorb moisture from the atmosphere and it frequently is difficult to assure that the salt is adequately cooled before it is delivered to the storage bins. If the salt is not adequately cooled, or if it contains an appreciable amount of moisture, lumping and caking of the salt in storage are apt to occur, which is objectionable for obvious reasons.

My invention is directed to an apparatus whereby the salt may be rapidly and adequately cooled and dried as it is delivered from the filter, by comparatively simple and inexpensive means, whereby the filter may operate continuously at maximum production with corresponding saving in cost of production of the salt. I have discovered that that result can be obtained by rapidly removing the moisture content of the salt by evaporation, thereby quickly drying the salt and also, by the cooling effect produced by the rapid evaporation of the moisture content, quickly reducing the temperature of the salt so as to cool it rapidly to proper temperature for delivery to the storage bins. More particularly, the salt discharged from the filter is delivered, by means closed to the atmosphere, to a flasher in which a partial vacuum of proper value is maintained, and is rapidly dried and cooled in the flasher, from which it is delivered to a suitable point of discharge, such as a conveyor belt, for delivery to the storage bins. While I have referred to the salt as being delivered to storage bins, by way of example, it may be delivered from the flasher to suitable containers for shipment. In either case, the salt delivered from the flasher is sufficiently cooled and dried to guard against lumping and caking thereof if it is thereafter properly handled and stored. Further objects and advantages of my invention will appear from the detail description.

The single figure of the drawing is a view in elevation, in part semi-diagrammatic, with certain parts broken away and shown in section to show interior parts, of the apparatus of my invenion.

The apparatus of my invention comprises a rotary suction filter 5 of known type, provided at each side thereof with a series of heating tubes 6 and a fan 7 for blowing air over the tubes, whereby air at high temperature is supplied to the interior of the filter for heating and assisting in drying the salt cake as it is formed on the filter drum, this drum (not shown) being of foraminous type, as is known. A suitable mixture of salt and brine, in the form of a slurry is delivered onto the screen of the drum at the upper portion thereof, by means of a feed box 8, as is known, and the salt cake formed on the drum is removed therefrom by suitable scrapers. Preferably the filter 5 is similar to that of my Patent No. 2,067,415, issued January 12, 1937, though any suitable type of filter and heating means may be employed within the broader aspects of my invention.

The filter 5 is provided with a downwardly tapering hopper bottom 9, of generally inverted frusto-pyramidal shape, having at its lower end a securing flange 10. The flange 10 seats on and is bolted to a corresponding flange 11 at the upper end of a short hopper 12 extending from and opening into an elongated cylindrical casing 13. This casing 13 receives a conveyor screw 14 fitting therein and having, at one end, a shaft 15 extending through a head 16 closing one end of casing 13. The screw 14 is provided at its other end with a shaft 17 extending through the other end of casing 13 and rotatably mounted in a bearing bracket 18. Shaft 15 is connected, by a suitable coupling 20, to one end of shaft 21 of a speed reducing unit 22, of suitable known type, the other end shaft 21ᵃ of which is connected, by a suitable coupling 23, to shaft 24 of an electric motor 25. It will be clear that when the motor 25 is in operation the screw 14 is driven and is effective for propelling along the casing 13 the salt delivered thereto from the filter 5.

The casing 13 opens at its other end into a vertical cylindrical casing or stack 27, adjacent the lower end thereof, the end wall of casing 13 adjacent stack 27 being inclined at 28 to direct the salt from the screw conveyor, comprising casing 13 and screw 14, into the stack 27. The stack 27 is mounted, by a frame 29, on a speed reducing unit 30 of suitable known type having a shaft 31 connected by a suitable coupling 32 to shaft 33 of an electric motor 34. The speed reducing unit 30 has driving connection to the lower end of a shaft 36 extending downward, through a suitable stuffing box 37 carried by frame 29, from the lower end of a conveyor or elevator screw 39 extending upward within stack 27 with a snug, but not tight, fit therein. As will be clear, the screw 39, when the motor 34 is in operation, is effective for moving upward through stack 27 the salt delivered thereto by the screw conveyor comprising casing 13 and screw 14.

The stack 27 extends upward a considerable distance within a flasher 40 which is, in general, of known construction and a brief description of which will suffice. This flasher 40 is provided, at its lower end, with a frusto-conical portion 41 having a depending collar 42 provided with an outwardly extending peripheral flange 43. Flange 43 seats upon and is secured to a cooperating flange 44 carried by a collar 45 extending about and secured to the stack 27. The flasher 40 is provided with a manhole 46 having a removable cover 47, and a suitably located sight glass 48 for observing the interior of the lower portion of the flasher. The upper end of stack 27 is open for delivery of salt therefrom into the flasher 40 and is provided with a circumferential flange 50 secured thereon. A downwardly flaring baffle 51 of frusto-conical shape, which is perforated or foraminous, is secured to flange 50 and extends therefrom downward and outward of flasher 40, with its lower edge spaced inward a material distance from the surrounding wall of the flasher. A shaft 52 extends upward from the upper end of screw 39, through the upper end or head 53 of flasher 40, into a bearing housing 55 secured to head 53 and containing appropriate bearing elements for shaft 52. A suitably formed scraper 56 is secured to shaft 52 and extends therefrom outward and downward in proximity to the inclined upper surface of baffle 51. This scraper rotates with the screw 39 and is effective for scraping the salt from the baffle 51.

The flasher 40 is connected, by a conduit 58 adjacent its upper end, to a condenser 59 of suitable known type from the lower end of which extends a tail pipe 60 for discharge of the condensate. A steam ejector 62, of suitable known type, is connected, at its intake end, to the upper end of condenser 59 by a pipe 63. Steam is supplied to the ejector 62, from a suitable source, through a steam pipe 64. The ejector 62 discharges into a direct contact after condenser 66 of suitable known type having a vapor discharge outlet 67. The flasher 40 is provided, at the lower portion 41 thereof, with an opening 68 into a downwardly inclined conduit 69, at the lower end of which is provided a rotary feeder 70 of known type having a downwardly extending discharge spout 71. This spout 71 may deliver the cooled and dried salt to the upper run of a belt conveyor 72 of known type, by which the salt may be conveyed to storage bins or other suitable receptacles. If desired, instead of delivering the salt to conveyor 72, the spout 71 may deliver the salt to sacks or other suitable containers. If desired, the rotary feeder 70 may be replaced by a substantially vertical discharge conduit 75, indicated in dot and dash lines, constituting a continuation of the conduit 69, the conduit 75 delivering the salt to a conveyor, or to a container, and being of such height as to maintain therein a column of salt of sufficient height to provide a seal effective for preventing entry of air through conduit 69 into the flasher 40.

The steam ejector 62 maintains a partial vacuum of proper value—about 25½ inches of mercury—within the flasher 40. The salt delivered from the filter 50 to the horizontal screw conveyor is hot, that is, at a temperature of from about 240° F. to 226° F., and has a moisture content of about 1%, mainly in the form of water vapor. This salt is delivered by the horizontal screw conveyor to the lower end of stack 27, and is moved upward in the latter, by means of the screw 39, in a substantially continuous column providing an air seal effective to prevent entry of air through stack 27 into the flasher 40. It will be noted that the salt is enclosed by casing 13 of the horizontal screw conveyor and by the stack 27, so as to be effectively shielded from the atmosphere during its travel from the filter to the flasher. As the salt moves upward in stack 27 it spills over the open upper end thereof onto the baffle 51 and is there subjected to the vacuum within the flasher 40. The moisture content of the salt is rapidly removed therefrom by evaporation, in the flasher, and this rapid evaporation of the moisture content of the salt causes quick cooling thereof to a temperature of about 160° F., while also removing all, or practically so, of the water content of the salt. The cooled and dried salt drops to the lower portion of the flasher 40, from which it is discharged through the conduit 69 and the rotary feeder 70, or the conduit 75, as the case may be. The salt as discharged from the flasher is completely dried and adequately cooled and may be stored or packaged without risk of lumping or caking due to moisture in the salt as initially stored or packaged.

When the salt cake is removed from the filter drum, by the scrapers, and falls into the hopper bottom 9 of the filter 5, portions thereof may tend to remain in cake form. At that time, however, the moisture content of the salt is low and the cohesion between the salt particles is slight, so that slight pressure exerted upon such portions of salt cake as may remain suffices to cause complete disintegration thereof. As the salt is propelled through the casing 13 by screw 14 it is subjected to slight pressure, sufficient to cause complete breaking up or disintegration of substantially all parts of salt cake which may enter the casing 13 of the horizontal screw conveyor. In the event pieces of salt cake should reach the stack 27, they will be there subjected to greater pressure than in the casing 13, due to the superimposed load of the column of salt moving upward through stack 27, and will be effectively broken up and completely disintegrated before they have moved upward in stack 27 any considerable distance. The two screw conveyors thus cooperate to assure that the salt will be delivered to the flasher 40 in a completely disintegrated and powdery condition, which is conducive to rapid drying and cooling of the salt with corresponding increase in production. It will be seen that by using screw conveyors I effectively shield the salt from atmospheric air during its travel from the filter to the flasher, and also assure that the salt will be delivered to the flasher in such condition as to assure maximum speed in drying and cooling of the salt. Conveniently, the casing of the horizontal screw conveyor is provided with a suitable inspection door 77, and the stack 27 is provided with an inspection door 78.

Under unfavorable conditions the temperature of the salt entering the flasher 40 may not be sufficiently high to assure that the salt will certainly be dried to desired extent. In order to guard against that, I provide suitable means for heating the salt in the flasher 40. I have shown, by way of example, an appropriately formed and perforated pipe 80 suitably disposed within the flasher 40, preferably, though not necessarily, below the normal salt level therein. Pipe 80 is connected by a pipe 81, provided with a control valve 82 and a pressure gauge 83, to a suitable source (not shown) of super-heated steam. By proper adjustment of valve 82, super-heated steam may be admitted to the flasher 40 in appropriate amount to compensate for any heat deficiency in the salt entering the flasher 40, thereby assuring that the salt will be completely dried and adequately cooled to the proper extent as above explained.

It will be understood that changes in detail may be made without departing from the field and scope of my invention, and I intend to include all such variations, as fall within the scope of the appended claims, in this application in which the preferred form only of my invention has been shown.

I claim:

1. In apparatus of the character described, a flasher having discharge means sealed to the atmosphere, a substantially vertical stack extending upwardly within said flasher a substantial distance above the bottom thereof and open at its upper end for discharge of material into said flasher, a baffle surrounding said stack adjacent the upper end thereof inclined downward and outward therefrom, means for delivering to said flasher through said stack, in a continuous column effective for sealing said stack against entry of atmospheric air, hot crystalloid material having an objectionably high moisture content, and means for evacuating said flasher, the latter being effective for rapidly removing by evaporation the moisture content of said material thereby drying it and substantially reducing its temperature.

2. In apparatus of the character described, a flasher having discharge means sealed to the atmosphere, a substantially vertical stack extending upwardly within said flasher a substantial distance above the bottom thereof and open at its upper end for discharge of material into said flasher, a baffle surrounding said stack adjacent the upper end thereof and inclined downward and outward therefrom, a conveyor screw operating in said stack effective for continuously feeding upward therethrough, in a column effective for sealing said stack against entry of atmospheric air, hot crystalloid material having an objectionably high moisture content, means for evacuating said flasher, the latter being effective for rapidly removing by evaporation the moisture content of said material thereby drying it and substantially reducing its temperature, and a scraper overlying said baffle in proximity thereto and secured to said screw for rotation therewith.

3. In apparatus of the character described, a flasher having discharge means sealed to the atmosphere, a substantially vertical stack extending upwardly within said flasher a substantial distance above the bottom thereof and open at its upper end for discharge of material into said flasher, a foraminous baffle surrounding said stack adjacent the upper end thereof inclined downward and outward therefrom and spaced from the surrounding wall of said flasher, a conveyor screw operating in said stack effective for continuously feeding upward therethrough, in a column effective for sealing said stack against entry of atmospheric air, hot crystalloid material having an objectionably high moisture content, and means for evacuating said flasher, the latter being effective for rapidly removing by evaporation the moisture content of said material thereby drying it and substantially reducing its temperature.

CLINTON S. ROBISON.

REFERENCES CITED

The following references are of record in the file of this patent:

UNITED STATES PATENTS

| Number | Name | Date |
|---|---|---|
| 788,741 | Trump | May 2, 1905 |
| 1,207,763 | Jaeger | Dec. 12, 1916 |
| 1,250,496 | Passburg | Dec. 18, 1917 |
| 1,415,160 | Dow | May 9, 1922 |
| 1,557,921 | Buel | Oct. 20, 1925 |
| 2,049,071 | McCormick | July 28, 1936 |
| 2,067,415 | Robison | Jan. 12, 1937 |
| 2,191,255 | Bonotto | Feb. 20, 1940 |
| 2,388,399 | Forster et al. | Nov. 6, 1945 |
| 2,465,963 | Beardslee | Mar. 29, 1949 |